United States Patent Office 3,509,855
Patented May 5, 1970

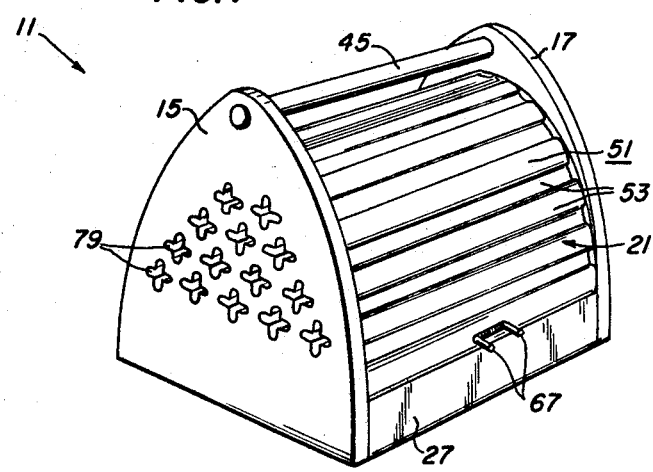
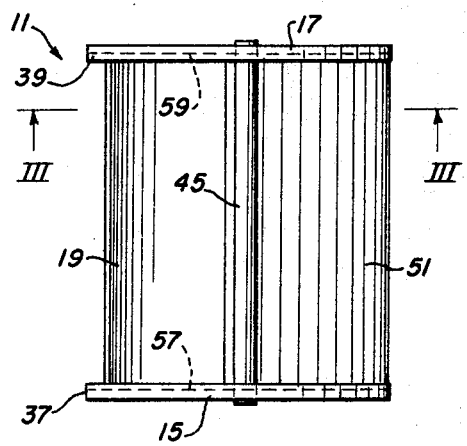
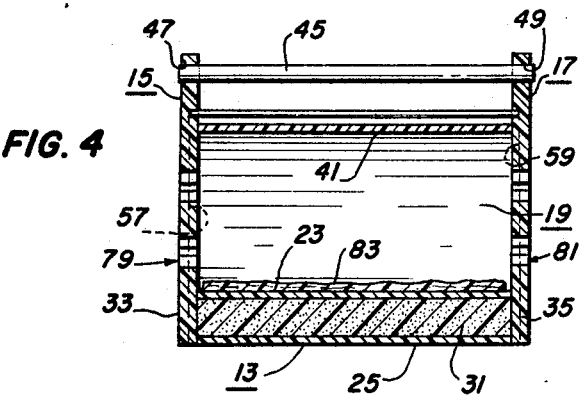
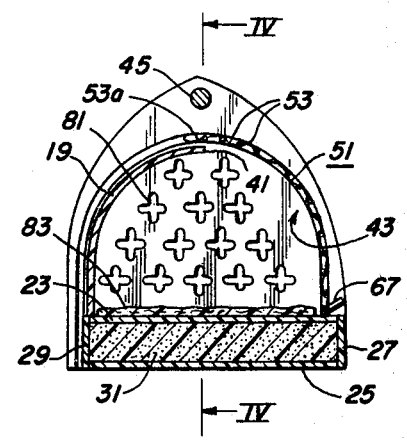
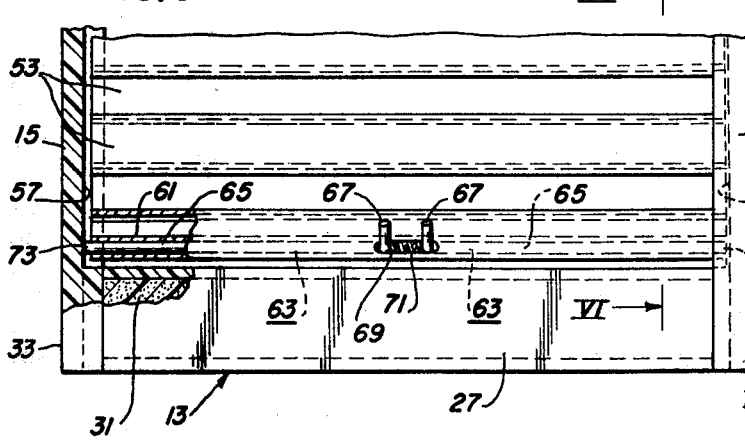
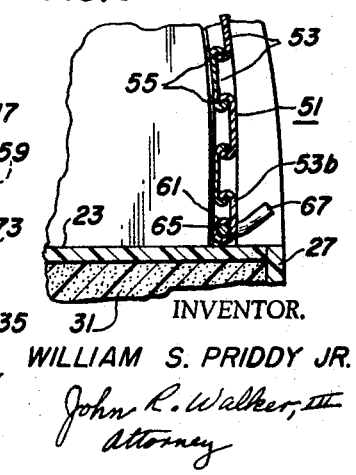

3,509,855
CARRIER FOR SMALL ANIMALS
William S. Priddy, Jr., Rte. 2, Oakland, Miss. 38948
Filed July 31, 1967, Ser. No. 657,303
Int. Cl. A01k 1/02
U.S. Cl. 119—19
1 Claim

ABSTRACT OF THE DISCLOSURE

A satchel-like container for housing or carrying a small animal, and having a slatted roll-top closure for access into the interior thereof, and including also insulated base means for insulating the animal against heat or cold when the carrier is rested on a hot or cold surface.

BACKGROUND OF THE INVENTION

Field of the invention

The invention pertains to various holders or constraining devices for animals and particularly such devices for housing small four-footed animals.

Description of the prior art

Various carriers for animals have heretofore been contemplated which were provided with handles for carrying the devices from one place to another, but to my knowledge none have been provided with roll-type tops and constructed in the novel manner of my invention, as will be more apparent in the description to follow.

SUMMARY OF THE INVENTION

The present invention provides a small readily portable carrier especially useful for transporting domestic animals and pets such as cats or small dogs. The carrier includes a roll-type top closure which may be opened to present substantially the entire interior of the carrier open and readily accessible. Moreover, the carrier closure when in an open or a closed disposition is arranged compactly in the carrier and does not include separable or hinged closure members. The carrier is useful for constraining or conveying small game animals such as mink, otter, coon or such animals trapped or raised for their pelts. The carrier is buoyant and in handling wild game animals supports the animal on the water in the event of an overturned boat or when it is desired to place the carrier on the water surface.

BRIEF DESCRIPTION OF THE DRAWING

FIG. 1 is a perspective view of the carrier of the present invention.

FIG. 2 is a top plan view of the carrier.

FIG. 3 is a vertical plane sectional view taken as on the line III—III of FIG. 2.

FIG. 4 is a vertical plane longitudinal sectional view taken as on the line IV—IV of FIG. 3.

FIG. 5 is an enlarged fragmentary view of the lower front portion of the carrier.

FIG. 6 is a fragmentary sectional view taken as on the line VI—VI of FIG. 5.

DESCRIPTION OF THE PREFERRED EMBODIMENT

The carrier of the present invention, indicated 11, is preferably constructed of plastic material and may optionally be formed substantially of molded construction or fabricated from plastic panels or sheets. For purposes of clarity and description, the carrier will be described as being fabricated from plastic sheets or panels.

Carrier 11 includes a base 13; side panels 15, 17; a rear panel 19; and closure means 21.

Base 13 is generally box-like and includes parallel arranged horizontal upper and lower panels 23, 25 and front and back vertical panels 27, 29 rigidly interconnecting upper and lower panels 23, 25. An open-cell type foam plastic block 31 is snugly fitted in the interior defined by upper, lower, front and back panels 23, 25, 27, 29 of base 13.

Side panels 15, 17 are preferably formed of sheet plastic material of substantially greater thickness than the thickness of the sheet material of base 13. Side panels 15, 17 are each generally miter-shaped and are secured in corresponding confronting parallel relationship respectively on the left and right end portions of base 13. The lower portions 33, 35 respectively of side panels 15, 17 are secured on the opposite end portions of base panels 23, 25, 27, 29 and abuttingly engage the respective opposite end surfaces of plastic block 31. The horizontal extension of side panels 15, 17 is somewhat greater than the horizontal extension of base 13 (see FIGS. 2 and 3). Thus, base 13 and side panels 15, 17 are in offset arrangement and rearward portions 37, 39 respectively of side panels 15, 17 project rearwardly from back panel 29 of base 13.

Rear panel 19 is fixedly secured between left and right side panels 15, 17 and extends upwardly and forwardly in a plane curve from the rear ward longitudinal portion of base panel 23. Rear panel 19 is arc-shaped in vertical transverse section and terminates in an edge portion 41 extending longitudially and along the vertical center plane of carrier 11. Back panel edge portion 41 in conjunction with the forward portion of base 13 and left and right side panels 15, 17 defines an opening 43 which opens upwardly and forwardly. A rod-like handle 45 secured respectively in openings 47, 49 in side panels 15, 17 provides handgrip carrying means for mainpulating carrier 11.

Closure means 21 includes a slatted roll-type door 51 operably fitted across access opening 43. Door 51 preferably includes a plurality of narrow channel-sectioned slats 53 preferably formed of plastic material. Slats 53 are arranged alternately facing inwardly and outwardly and are preferably bonded together along longitudinal corresponding edges as indicated at 55. Confronting correspondingly arranged grooveways 57, 59 are formed respectively in side panels 15, 17 and provide track means for door 51. Grooveways 57, 59 each are generally in inverted U configuration and extend upwardly from the forward portion of base 13 rearwardly along the apex of side panels 15, 17 and downwardly to terminate in rearward portions 37, 39 of the side panels. The opposite end portions of slats 53 are slidably fitted respectively in grooveways 57, 59. The vertical extension of door 51 is of sufficient length to fully close access opening 43.

Upper terminal slat 53a is closely superjacently arranged relative to upper edge portion 41 of rear panel 19 when door 51 is in a closed disposition. Lower terminal slat 53b forms a tubular portion 61 extending coextensive the length of slat 53b. A pair of lock plungers 63, 63 are operably fitted in tubular portion 61 of slat 53b. Lock plungers 63, 63 each include a horizontal slide portion 65 and an obliquely extending handle portion 67. An oblong aperture 69 is formed in the central portion of tubular portion 61; handle portions 67, 67 of plungers 63, 63 extend through aperture 69 and provide finger grip means for converging manipulation of plungers 63, 63. A compression spring 71 fitted between handle portions 67, 67 urges plungers 63, 63 apart. The terminal portions 73, 73 respectively of plunger 63, 63 are adapted to abuttingly engage respectively the grooveway bottom vertical surfaces respectively of grooveways 57, 59. By convergingly compressing handle portions 67, 67 and vertically manipulating door 51, a desired opening into the interior of carrier 11 is obtained. A plurality of apertures 79, 81 are preferably provided in side panels 15, 17 to provide fresh air ventilation for an animal contained in carrier 11. A sponge-type plastic mat 83 is preferably provided on base upper panel 23 and covers substantially the entire upper surface of base 13.

Now, while I have shown and described an exemplary embodiment of the present invention, it will be understood that various modifications and rearrangements of components and elements of structure may be made without departing from the scope of the present invention.

I claim:

1. A carrier for small animals comprising an oblong base including parallel arranged horizontal upper and lower panels, parallel vertical front and back panels, and an open-cell type foam plastic block secured in the interior of said upper, lower, front and back panels and substantially filling the interior area defined by said panels; a left and a right side panel secured respectively on the left and right end portions of said base in corresponding confronting parallel relationship and with each side panel being secured along a horizontal lower portion thereof to said base and upstanding therefrom; a rear panel fixedly secured between said left and right side panels and extending upwardly and forwardly in a plane curve from the rearward longitudinal portion of said base toward the upper central portions respectively of said left and right side panels and defining in conjunction with said base and said side panels an access opening into the interior of said carrier generally opening upwardly and forwardly relative to said carrier; an oblong handle secured on and bridging said left and right side panels for manipulation of said carrier; closure means for selectively opening or closing said access opening including means defining a left and a right grooveway arranged respectively on said left and right side panels and with said grooveways being in corresponding confronting relationship and with each grooveway being generally in an inverted U configuration and including a slatted articulated roll-type door having left and right edge portions guidingly slidingly secured respectively in said left and right grooveways; said door being adapted to be manipulated to and from an open position in which the major portion of said door is arranged contiguous said rear panel and a closed disposition in which said door is arranged across said access opening.

References Cited

UNITED STATES PATENTS

| | | | |
|---|---|---|---|
| 2,051,421 | 8/1936 | Richard. | |
| 2,538,778 | 1/1951 | Halpin | 119—19 |
| 2,552,007 | 5/1951 | Griffith | 119—19 X |
| 2,790,414 | 4/1957 | Rossow | 119—19 |
| 3,150,791 | 9/1964 | Shile | 220—41 X |
| 3,351,405 | 11/1967 | Ferdinand et al. | 160—231 X |

HUGH R. CHAMBLEE, Primary Examiner